May 2, 1961  W. TIRASPOLSKY  2,982,517
WELL DRILLING TURBINES
Filed Aug. 2, 1957  2 Sheets-Sheet 1

May 2, 1961  W. TIRASPOLSKY  2,982,517
WELL DRILLING TURBINES
Filed Aug. 2, 1957  2 Sheets-Sheet 2
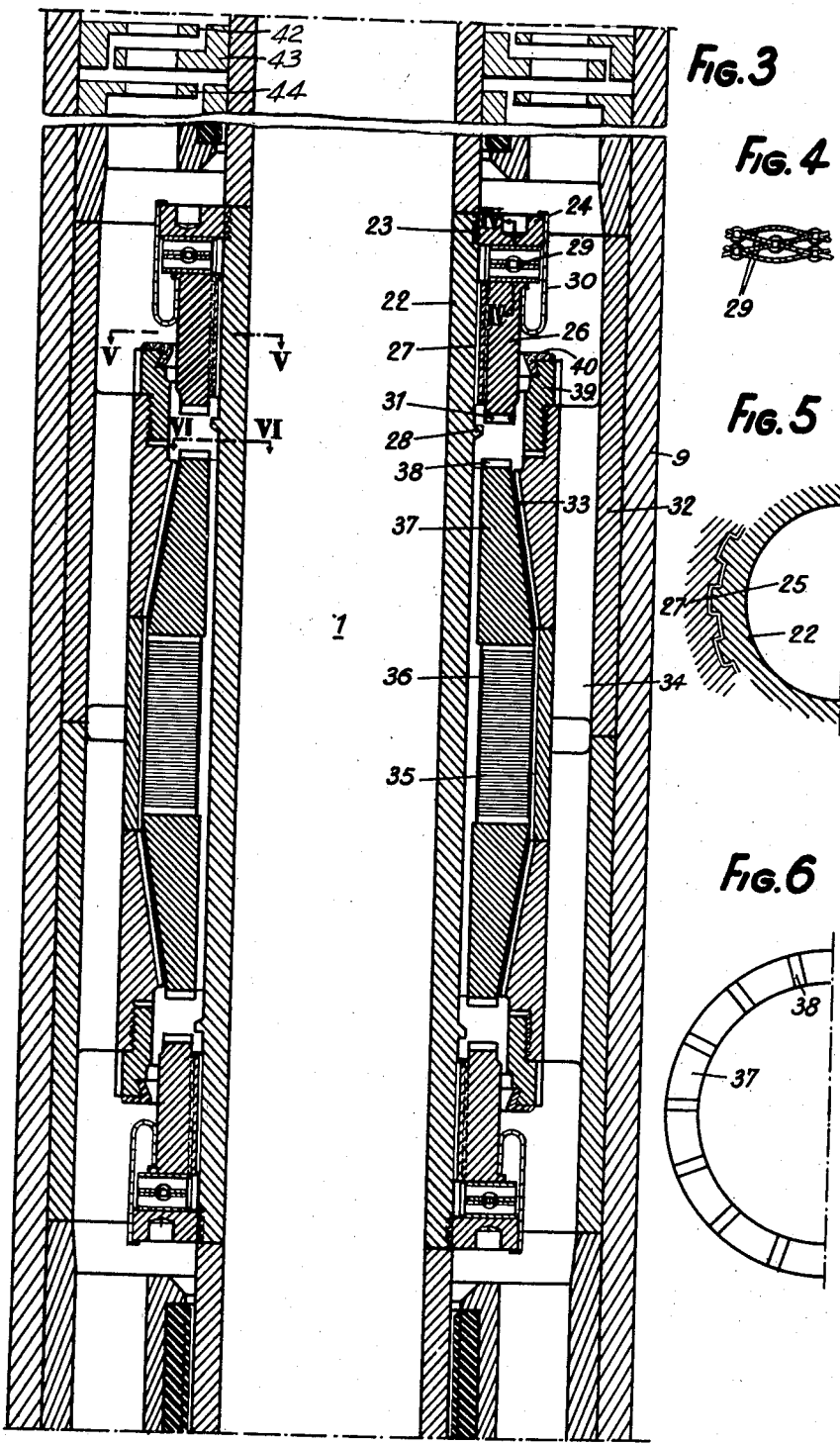

United States Patent Office 2,982,517
Patented May 2, 1961

2,982,517
WELL DRILLING TURBINES
Wladimir Tiraspolsky, 69 Ave. Victor Cresson, Issy-les-Moulineaux, France Filed Aug. 2, 1957, Ser. No. 675,904

Claims priority, application France Aug. 10, 1956

11 Claims. (Cl. 253—59)

It is known that the motive part of a modern motor for sub-surface work and particularly of a well-drilling turbine is generally constituted by a stack of turbine wheels and abutment parts. The movable parts building up the rotor of the turbine are alternated with its stationary parts of which the turbine stator is made up.

The service duration of such a motor or turbine between two consecutive overhauls is determined among other factors by the permissible maximum axial wear of the bearing faces of the abutment elements. Where the wear exceeds the limit mark in the one or the other direction, the elements which are angularly movable, such as blade sets, come into contact, thereby causing damage or even destruction of the turbine.

Wear supervision, which must be effected under present practice at each operation of the turbine, involves an appreciable loss of time which demands skilled personnel. This operation remains hazardous. Moreover in order to stave off the risk of overshooting the danger mark as drilling is being performed, turbines are often discarded or sent to the repair shop before total wear is actually reached, thereby increasing the service cost of the turbine.

An object of the invention is to remedy the aforesaid disadvantages by the provision of an improved motor or turbine capable of performing its operative duty right up to the attainment of the permissible maximum wear mark.

Another object of the invention is to provide a motor and particularly a well-drilling turbine utilizable for exploiting oil fields comprising a stack of stator and rotor parts and operatively connected to the turbine a wear-limiting device constituted by braking means adapted to become operative for bringing the turbine to a standstill where the permissible maximum wear mark is reached in either the one or the other axial direction.

In one aspect of the invention, the turbine includes concentric stationary and rotatable parts, additional elements connected to the stationary parts, and additional elements operatively connected for joint angular motion to the rotatable parts, the assembly being such that said respective elements are caused mutually to cooperate as the maximum wear mark is reached for slowing down the rotational speed of the turbine and for stopping the same.

In one constructional form of the invention, triggering of the braking device as maximum wear mark is exceeded may be limited to one direction and may take place for example upwardly or downwardly or simultaneously in both directions.

For a better understanding of this invention, reference will now be made to the accompanying drawings wherein:

Fig. 3 is a vertical sectional view of still another constructional modification.

Figs. 4, 5 and 6 are detail sectional views respectively along the lines IV—IV, V—V and VI—VI in Fig. 3.

Figure 1:
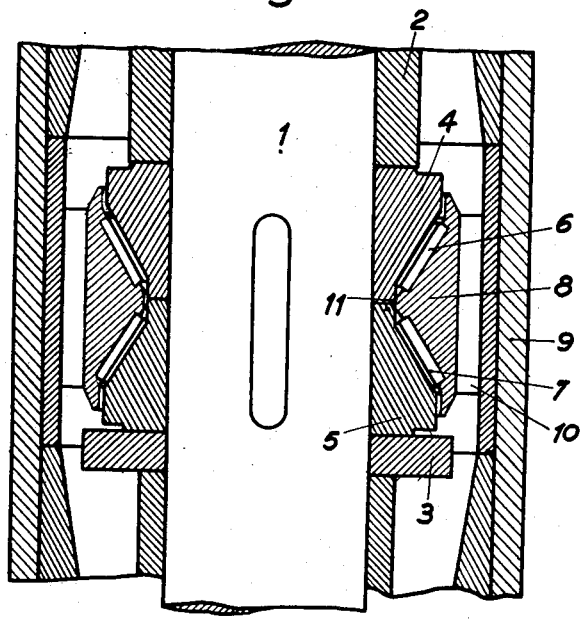
Fig. 1 is a longitudinal sectional view of a primary constructional form of the improved braking or motion-checking device as embodied in a well-drilling turbine.

In the showing of Fig. 1 which illustrates a braking or motion-checking device adapted to operate in two directions, that is to say to exert a braking effect when the maximum wear mark is reached either upwardly or downwardly, there is provided on the turbine shaft 1 between two freely selected parts 2, 3, of the usual stacking a pair of truncated cones 4, 5 connected for example by keying for joint angular motion to said shaft. Such truncated cones 4, 5 are arranged in front of, or oppositely, conical faces carrying suitable friction linings 6, 7 provided on a member 8 which may be interposed in the stack of parts piled up inside the body 9 of the turbine. Said member 8 has channels 10 for the flow of the circulating fluid.

A slight radial clearance is provided as shown at 11 between the cones 4, 5 and the member 8 so as normally to permit free rotation of the shaft 1. Moreover there is provided on both sides between the friction linings 6, 7 and the confronting faces of the truncated cones 4, 5 axial clearances matching the permissible maximum wear mark for the turbine.

As wear takes place, the oppositely located faces of the cones 4, 5 and friction linings 6, 7 are progressively brought nearer to one another. As either of the limit wear marks is reached, that is to say when the degree of wear of the abutments exceeds the aforesaid axial clearance either downwardly or upwardly, said oppositely located faces are brought into mutual contact, thereby inititing braking action to bring the motion of the turbine to a standstill. From now on, any movement of the bit is prevented so that even in the absence of a tachometer showing the turbine speted, the operator is incited to pull up the tool to the surface, whereby any risk of the turbine becoming damaged owing to undue wear is obviated.

Figure 2:
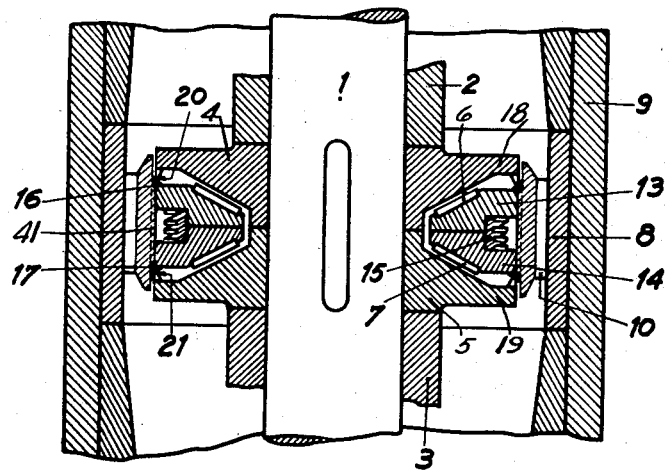
Fig. 2 is a longitudinal sectional view of a further constructional form of said braking or motion-checking device.

In the constructional form shown in Fig. 2, in which like reference numerals designate like parts as in Fig. 1, the friction linings 6, 7 are carried by a pair of conical ring members 13, 14 arranged for axially slideable motion inside the member 8 operatively connected to the turbine but angularly rigid with said member. Conical ring members 13, 14 are held in a normal inoperative position by welded seams 16, 17 which connect them to stationary member 8. The arrangement permitting the axially slideable but angularly rigid motion of members 13, 14 relative to member 8, effective only upon release of welded seams 16, 17, may be any conventional arrangement such as keying or splining 41. A spring 15 or equivalent elastic means such as washers of the Belleville type or the like are interposed between the two conical ring members 13, 14 for axially urging them apart.

The cones 4, 5 are provided with collars or flanges 18, 19 which extend radially and outwardly and are provided on their outer face with sharp edges 20, 21 extending toward the welded seams 16, 17. As wear of the abutments takes place, one of said sharp edges 20 or 21 gradually bites into the welded seams 16, 17. When the limit wear mark is reached, a sudden cut off occurs and the conical ring member or members 13, 14, being suddenly released, are instantaneously urged by the spring 15 or the equivalent member against the confronting face of the cone or cones 4, 5, thereby exerting a braking action which slows down the turbine and soon brings it to a standstill.

This sudden application of the brake which exerts a sufficient force for immediately stopping the turbine prevents an eventual wear of the friction surface owing to rotation which, but for positive braking action, could continue between the instant when the two confronted surfaces meet and the instant when they are fully locked. Furthermore, this sudden triggering action permits suitably shaped parts such for example as dogs, teeth or like parts provided on the cones 4, 5 and on the oppositely located conical ring members or on equivalent members to be brought into meshing relation. In the constructional form shown in Fig. 2, the axial stroke of one of the conical ring members 13, 14 should be larger than the corresponding maximum axial clearance of the abutments so as to maintain locking conditions for all respective axial inter-relations of the turbine stator and rotor.

In the showing of Fig. 3 there is illustrated a turbine including stator parts 42 and 44, axially spaced on opposite sides of rotor part 43. Stator parts 42 and 44, being connected to turbine body 9, are thus relatively nonmovable and rotor part 43, being connected to shaft 1, is rotatable therewith. Shaft 1 carries a sleeve member 22 angularly rigid with it. This sleeve member 22 acts as a carrier for a portion of the braking device which, in the present form, is of the two-side type. The following description only refers to the elements of the device which perform the braking action when the wear mark is reached in one direction, it being understood that a similar phenomenon takes place likewise in the other direction.

The sleeve member 22 has a threaded portion 23 to which a ring member 24 is screwed and it is provided underneath said threaded portion with flutes 25 which receive a ring member 26 having inner flutes 27. The ring member 26 is thus angularly rigid with or splined to the shaft 1 while being capable of moving axially with respect to it. A shoulder 28 limits the stroke of the ring member 26. Corrugated springs 29 the undulations of which are oppositely arranged as visible in Fig. 4 are interposed between the ring members 24 and 26 and constantly urge the ring member 26 away from the ring member 24. However the ring member 26 is normally retained by a stamped sheet of metal 30 secured to each of said ring members and having its lower end portion folded upon itself for forming a half torus. The ring member 26 is provided along its lower edge with dogs or tangs 31.

The body 9 of the turbine carries a part 32 which provides inwardly directed conical friction faces 33 lagged with a friction lining which may be made of any suitable material. Channels 34 are provided in the part 32 for allowing flow of the circulating fluid. The conical portions of the two parts 32 of the two companion braking or motion-checking devices are separated by a spacer ring 35. A stack of circular leaf springs 36 is arranged inside said spacer ring for urging the frictional face of the cone 37 against the oppositely disposed face 33 while acting as a torque limiter. The friction cone 37 carries meshing dogs 38. The part 32 is provided with a ring member 39 held by being screwed up and provided with an abrasive edge 40 extending in front of the bent portion of the sheet metal part 30 at a distance from the latter which is slightly smaller than the limit wear mark of the turbine parts.

The operation of the device is as follows:

Assuming the turbine to have so operated that it has nearly reached its wear mark, i.e. the point at which the turbine rotor and stator parts have worn to effect maximum allowable axial movement therebetween so as to bring them to their minimum allowable axial spacing, the abrasive edge 40 comes into engagement with the sheet metal part 30 and shears it off. The ring member 26 is then freed and due to the action of the springs 39, its dogs 31 are suddenly brought into meshing relation with the dogs 38 provided on the cone 37. The friction surfaces of the parts 37 and 32 then act for braking the rotor part of the turbine as will be obvious to those skilled in the art.

The symmetrical arrangement of the parts of the device permits an equivalent braking or motion-checking action irrespective of whether the axial wear takes place in one sense or in the other.

What is claimed is:

1. In a motor for sub-surface work such as a well drilling turbine having stacked stator and rotor parts susceptible to relative axial wear; stationary parts, rotatable parts concentric with said stationary parts, an element connected to the rotatable parts for joint angular motion with them and having a primary breaking surface, an element angularly rigid with the stationary parts and having a secondary braking surface, holding means for normally maintaining said primary and secondary braking surfaces spaced from each other, means urging said respective braking surfaces toward each other, and means for eliminating the action of said holding means when the maximum allowable axial wear between the stator and rotor motor parts is reached for bringing said braking surfaces into mutual contact responsive to the action of the urging means for stopping the motor.

2. In a motor for sub-surface work such as a well drilling turbine having stacked stator and rotor parts susceptible to relative axial wear; stationary parts, rotatable parts concentric with said stationary parts, elements connected to the rotatable parts for joint angular motion with them and having a primary set of oppositely directed braking surfaces, elements angularly rigid with the stationary parts and having a secondary set of oppositely directed braking surfaces, the braking surfaces of the secondary set being located opposite the braking surfaces of the primary set, holding means for maintaining the braking surfaces of the respective primary and secondary sets spaced from one another, urging means for bringing said respective braking surfaces toward one another, and means for doing away with the action of said holding means when the maximum allowable axial wear between the stator and rotor parts is reached in the one or the other direction for causing the oppositely located braking surfaces of the primary and secondary sets to be brought into contact due to the action of said urging means.

3. In a motor for sub-surface work such as a well drilling turbine having stacked stator and rotor parts susceptible to relative axial wear; stationary parts, rotatable parts stacked with said stationary parts, elements interposed between the rotatable parts and connected to them for joint angular motion with them, a primary set of conical and oppositely extending braking surfaces of said elements, further elements interposed between the stationary parts and angularly rigid with them, a secondary set of conical and oppositely extending braking surfaces on said further elements, the last-named braking surfaces being located opposite to the first-named braking surfaces, elastic means urging the braking surfaces of the secondary set toward the braking surfaces of the primary set, holding means for normally maintaining the braking surfaces of the secondary set spaced from the braking surfaces of the primary set, and means carried by the first-named elements for doing away with the action of said holding means upon reaching of the maximum allowable wear between the stator and rotor parts so that the oppositely located braking surfaces of the primary and secondary sets are brought into cooperation responsive to the action of the urging means.

4. In a motor for sub-surface work such as a well drilling turbine having stacked stator and rotor parts susceptible to relative axial wear; stationary parts, rotatable parts concentric with said stationary parts, a pair of cones interposed in said rotatable parts and connected thereto for joint angular motion therewith, a primary set of tapered and oppositely extending braking surfaces on said cones, an annular carrier member interposed in said stationary parts and connected thereto, a pair of conical ring members mounted for axial sliding motion in said annular carrier member, a secondary set of tapered and oppositely extending braking surfaces on said ring members, the braking surfaces of the secondary set being arranged opposite to the braking surfaces of the primary set, elastic means interposed between said conical ring members for urging their braking surfaces toward the braking surfaces of the cones, holding means for normally maintaining said conical ring members inwardly of said carrier member in a position wherein the braking surfaces are spaced from one another, engaging means on said cones for eliminating the action of said holding means responsive to reaching of the maximum allowable axial wear between the stator and rotor parts so that the elastic means urge the braking surfaces of the primary and secondary set into mutual contact and stop motion of the motor.

5. A motor for subterranean work such as a turbine for oil well or similar drilling according to claim 4, wherein the holding means are constituted by lines of welding which hold the conical ring members on the annular carrier member, the engaging means being constituted by cutting edges provided on the cones and adapted to come into engagement with said lines of welding for shearing off the latter when the maximum allowable axial wear between the stationary and rotatable motor parts is reached.

6. In a motor for sub-surface work such as a well drilling turbine having stacked stator and rotor parts susceptible to relative axial wear; stationary parts, rotatable parts concentric with said stationary parts, a primary member angularly rigid with the stationary parts, a friction surface on said primary member, a cone having a friction surface on said primary member, a cone having a friction surface arranged in front of said member, resilient means urging the friction surface on said cone against the friction surface of said member, meshing elements on the cone, a secondary member angularly rigid with the rotatable parts of the turbine, meshing elements on the last-named member, holding means for normally maintaining said meshing elements on said secondary member off the meshing elements on the cone, and means operative on said holding means as the maximum allowable axial wear between the stator and rotor parts is reached for liberating said secondary member and for permitting said meshing elements on said cone and on said secondary member to come into engagement for checking the motion of the rotor parts of the motor or turbine.

7. A motor for subterranean work such as an oil well drilling turbine according to claim 6 wherein the holding means for maintaining said cone meshing elements and secondary member meshing elements separate includes a sheet metal detent secured to said rotor and engaging said secondary member to prevent axial movement of said secondary member meshing elements, resilient means urging said secondary member meshing elements toward said aforesaid cone meshing elements, and a cutting edge axially rigid with the stacked stator parts for engaging said sheet metal detent and shearing it off upon the reaching of the maximum allowable axial wear between the stationary and rotatable motor parts.

8. In a motor for sub-surface work such as a well drilling turbine having stacked stator and rotor parts susceptible to relative axial wear; stationary parts, rotatable parts concentric with said stationary parts, primary members angularly rigid with the stationary parts, conical friction surfaces tapering in opposite directions on said members, cones having friction surfaces arranged opposite to the friction surfaces of said members, resilient means interposed between said cones and urging the friction surfaces on the cones against the friction surfaces on the members, oppositely directed meshing elements on the cones, secondary members angularly rigid with the rotatable parts of the motor, oppositely directed meshing elements on said secondary members, means urging said meshing elements on the secondary members toward the meshing elements on the cones, holding means normally maintaining the respective meshing elements spaced from one another, and means for operating on said holding means when the maximum allowable wear between the stationary and rotatable motor parts is reached in the one or the other sense for liberating one of said secondary members carrying the meshing elements so as to permit them to come into engagement with the meshing elements on one of the cones for checking the motion of the motor or turbine.

9. In a motor for sub-surface work, such as a well drilling turbine having stacked stator and rotor means susceptible to relative axial wear; a stationary part, a rotatable part concentric with said stationary part, a primary braking surface carried by one of said parts, a member providing a secondary braking surface, and connecting means to angularly secure said member to the other of said parts, and brake actuator means, said actuator means including brake actuator releasing means carried by said one of said parts and brake actuator holding means carried by said other of said parts, said releasing and holding means being axially spaced a distance not to exceed the maximum allowable axial wear between said stator and rotor means whereby, upon being brought into engagement responsive to relative axial motion of said stator and rotor means, said holding means is released, allowing said brake actuator to cause said secondary braking surface to engage said primary braking surface to bring said motor to a standstill.

10. In a motor as recited in claim 9 wherein said connecting means comprises a keying of said member to said other of said parts.

11. In a motor as recited in claim 9 wherein said connecting means includes axially movable meshing elements.

References Cited in the file of this patent

UNITED STATES PATENTS

| | | |
|---|---|---|
| 881,563 | Emmet | Mar. 10, 1908 |
| 1,102,748 | Hauer | July 7, 1914 |
| 1,165,594 | Hani | Dec. 28, 1915 |
| 1,284,702 | Junggren | Nov. 12, 1918 |
| 1,469,045 | MacMurchy | Sept. 25, 1923 |
| 1,591,937 | Earle et al. | July 6, 1926 |
| 1,864,113 | Anderson | June 21, 1932 |
| 2,384,872 | Baker et al. | Sept. 18, 1945 |

FOREIGN PATENTS

| | | |
|---|---|---|
| 167,457 | Australia | Apr. 13, 1956 |
| 701,530 | Great Britain | Dec. 30, 1953 |